Nov. 8, 1938.　　　C. F. WEINREICH　　　2,136,224
RECEPTACLE FILLER FOR ICE CREAM
Filed Jan. 12, 1937
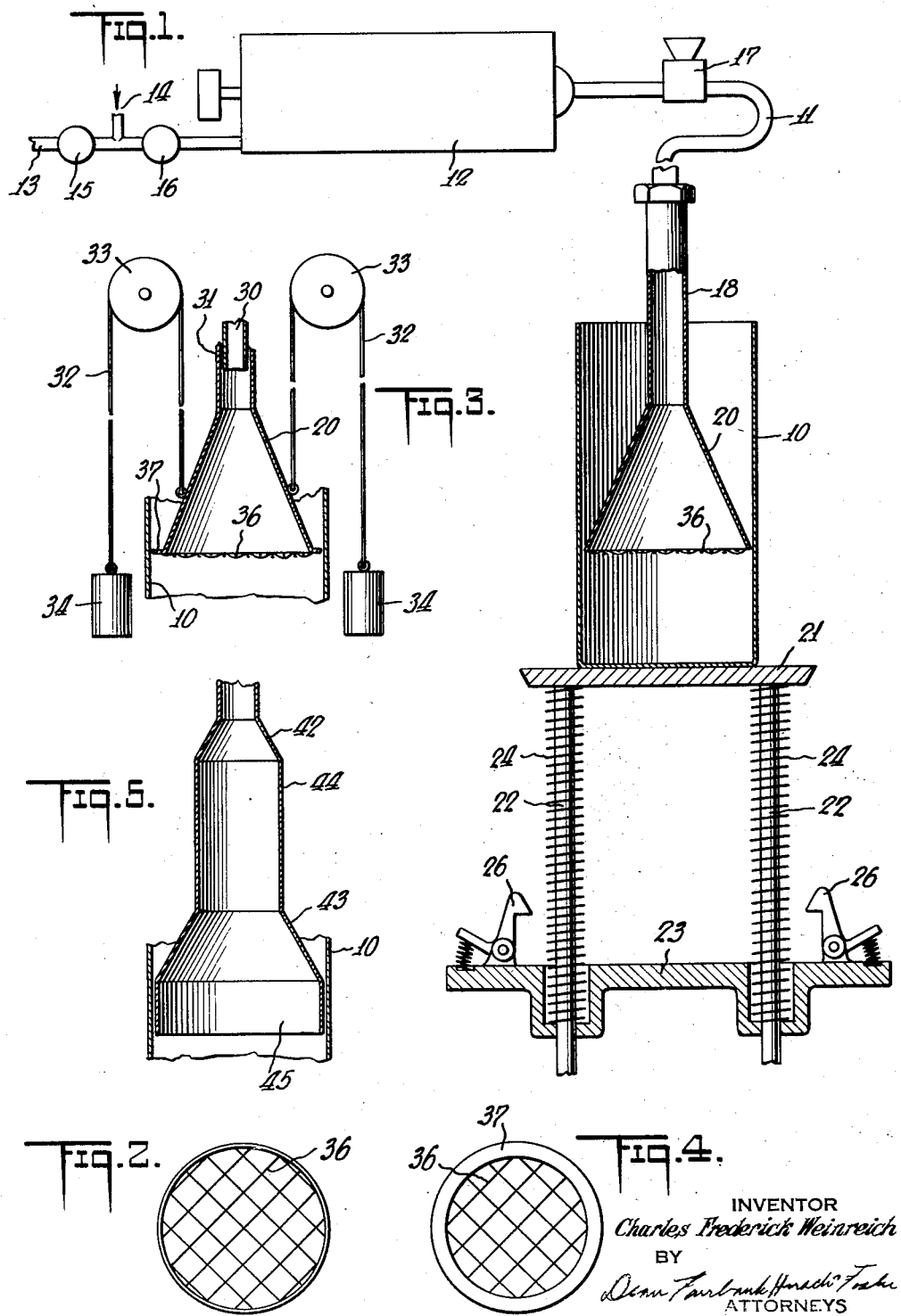
INVENTOR
Charles Frederick Weinreich
BY
ATTORNEYS Patented Nov. 8, 1938

2,136,224

UNITED STATES PATENT OFFICE 2,136,224

RECEPTACLE FILLER FOR ICE CREAM

Charles Frederick Weinreich, Des Plaines, Ill., assignor to Cherry-Burrell Corporation, Chicago, Ill., a corporation Application January 12, 1937, Serial No. 120,215

9 Claims. (Cl. 226—125)

The present invention relates to apparatus for filling receptacles in succession with an aerated partially frozen ice cream or other analogous products continuously delivered from a pressure freezer and sufficiently stiff so that it does not promptly seek its own level in the receptacle.

One form of apparatus for filling receptacles with ice cream delivered under pressure in plastic semi-frozen condition from a continuous freezer through a conduit and directly into a receptacle for hardening, storage and transportation is that shown in the Vogt and Wyman Patent 1,881,106. The lower end of the conduit projects into the open top of the receptacle during the filling operations and said conduit and said receptacle are relatively moved apart in a substantial vertical direction during said operations. The conduit has an outlet end substantially smaller than the cross-section of the receptacle and there is provided a spreader member of substantially the shape and cross-sectional area of the receptacle so as to level off the ice cream towards the sides of the receptacle and prevent the incorporation of air pockets.

Ice cream mix after being subjected to a freezing, whipping and aerating action in a continuous freezer, will be in a plastic semi-frozen condition with the fat, entrapped air, and ice crystals uniformly dispersed through the mass.

There is a tendency toward rupture of the moisture film surrounding the fat globules, ice crystals and entrapped air, caused by the substantial friction between the conduit walls and the ice cream flowing through the conduit. This friction is increased if the flow at the outlet end of the conduit is restricted. Rupture of the moisture films is also caused by rapid expansion at the end of the delivery conduit.

In the type of device above referred to the spreading or leveling off operation referred to forces a thin layer of ice cream from the center towards the side of the receptacle, this layer being too thin to permit the larger particles of solid material such as fruit, nuts, or candies to pass therewith towards the sides of the receptacle, so that these particles tend to remain in the central portion of the receptacle.

Among the objects of the present invention are to provide a method and apparatus which will insure the maintenance of the same proper distribution of ice crystals, fat globules and incorporated air in the delivered ice cream as was established in the freezer; to establish a controllable and regulated relation between the reduction of friction and the reduction of pressure, as the ice cream passes from the conduit into the container; and to make possible the preservation of the moisture film in the ice cream, which insures the proper dispersion of the various ingredients comprising the ice cream mix.

A further object is to provide a filling device in which the uniform distribution of solid particles therein, such as fruit, nuts, or candy, is insured in the ice cream after it is packed in the receptacle.

In carrying out the present invention, I provide a delivery conduit having a discharge nozzle widening towards its outlet end and presenting a maximum cross-section at said end, so that the pressure of the ice cream decreases as it flows towards said outlet end and the friction between said flowing ice cream and the walls of said discharge nozzle is gradually reduced to an extent necessary to preserve the moisture films which insure proper dispersion of the various ingredients of the ice cream.

As an additional feature, the outlet end of the discharge nozzle conforms substantially with the cross-section of the receptacle, so that the ice cream is expanded in said nozzle to the approximate cross-section of the receptacle, thereby maintaining uniform distribution of the solid particles in the receptacle.

Various other objects, features and advantages of the invention will be apparent from the following description and from an inspection of the accompanying drawing in which:—

Fig. 1 is a plan view, somewhat diagrammatic, showing the combination of a primary continuous freezer, a device for injecting solids into the stream of stiff partially frozen ice cream, and one form of receptacle filling device embodying the present invention.

Fig. 2 is a bottom plan view of the lower end of the discharge nozzle of the construction of Fig. 1 and showing a form of grating for supporting the ice cream in the nozzle against tensile breakage while exchanging an empty container for a filled one.

Fig. 3 is a vertical section through another form of discharge nozzle embodying the present invention, Fig. 4 is a bottom plan view of the lower end of the discharge nozzle shown in Fig. 3, and Fig. 5 is a vertical section through a part of a container and another form of discharge nozzle embodying the present invention.

The type of apparatus illustrated is especially adapted for filling an ordinary ice cream can or receptacle 10 such as is commonly used for the storage, hardening and shipment of ice cream. The filling apparatus is connected to a conduit 11 which is shown as leading from a continuous pressure freezer 12.

A type of continuous freezer in connection with which the present invention may be used is shown in the Vogt Patents 1,783,864, 1,783,865, and 1,783,867 issued Dec. 2, 1930. Such a pressure freezer is connected to a suitable source of supply of ice cream mix 13, and to a source of air 14, these materials being delivered under pressure to the freezer and in predetermined relative proportions. For that purpose there may be employed a metering pump 15 and a pump 16 of greater speed or capacity to suck in the air and the metered mix and force both into and through the freezer. This ice cream mix is subjected in the freezer to agitation and refrigeration while air is being incorporated therein to give it the desired overrun. The ice cream delivered under pressure from the freezer through the conduit 11, is a semi-frozen plastic product containing air, fat and ice crystals uniformly dispersed throughout the mass.

Solid particles such as fruits, nuts and candies may be injected into the ice cream after it leaves the freezer. For that purpose, there is diagrammatically shown in Fig. 1, on the discharge side of the freezer 12, a fruit or nut feeder 17 which may be of the general type shown in the Vogt Patents Nos. 2,032,961 and 2,032,962, or the Bendfelt Patent No. 2,032,971, issued March 3, 1936.

Depending substantially vertically from the supply pipe 11 is my improved can filling apparatus which in the specific form shown in Figs. 1 and 2 includes a delivery conduit 18 having at its lower end a discharge nozzle 20 adapted to project into the open top of the receptacle 10 during filling operations.

As an important feature of the present invention, the nozzle 20 is so shaped that as the ice cream flows therethrough, it progressively expands, thereby reducing the pressure of said ice cream and correspondingly reducing the friction between the flowing ice cream and the walls of the discharge nozzle to an extent necessary to preserve the moisture films in the ice cream. In the construction shown in Figs. 1 and 2, the discharge nozzle is in the form of a cone or an inverted funnel presenting a maximum cross-sectional area at its outlet end, so that the expansion of the flowing ice cream through this nozzle is effected gradually and progressively as it approaches the outlet end of the nozzle.

As a further feature of the present invention, the outlet end of the discharge nozzle 20 has a cross-section corresponding substantially to the cross-section of the receptacle 10, so that the ice cream is expanded in the discharge nozzle to the approximate full size of said receptacle. This construction has the advantage of eliminating the necessity for a spreading device, or if a spreading device is used to confine its action to the peripheral portion of the receptacle, so that the uniform distribution of solid particles in the ice cream established in the injecting apparatus 17 is maintained in this receptacle.

The receptacle 10 and the nozzle 20 are relatively movable vertically during filling operations, at a rate dependent upon the rate of accumulation of the material in the receptacle 10. The details of the means for permitting or aiding this relative movement of the receptacle 10 and the discharge nozzle 20 form no part of the present invention and may be of the type shown in Fig. 1.

In this construction the receptacle 10 is supported on a platform 21, having a plurality of supporting guides 22 depending therefrom, and passing through a fixed platform 23, so that said platform 21 is guided for vertical movement. This platform 21 is normally urged into its uppermost position by coil springs 24 which may encircle the guide rods 22.

As the ice cream accumulates in the receptacle 10, said receptacle is moved downward against the action of the springs 24 at a rate depending on said accumulation, until the platform 21 reaches its lowermost position. In this position the top of the receptacle will be slightly below the outlet end of nozzle 20, so that said receptacle can be moved laterally to shear off the flowing stream of ice cream across the top of said receptacle.

In order to prevent the immediate upward movement of the platform 21 the instant the filled receptacle is removed and before it can be replaced by an empty one, there may be provided one or more latches 26, which automatically engage the platform 21 in its lowermost position, and hold it until manually released.

In Fig. 3 is shown another form of construction which may be used for effecting relative movement of the receptacle and the nozzle vertically. In this construction the delivery conduit comprises a stationary section 30 connected to the conduit 11, and a movable section 31, encircling said stationary section 30, and connected to the upper end of the nozzle 20.

The receptacle 10 is stationary during the filling operation, and the discharge nozzle 20 with its associated conduit section 31 is moved upwardly in the receptacle 10 by the accumulation of material in said receptacle. In order to assist in this upward movement of the discharge nozzle 20, or to counterbalance the weight of the parts, there is provided a pair of cables 32 each connected at one end to said nozzle, passing around a pulley 33, and connected at the other end to a counterweight 34. As the material is forced through the nozzle the accumulation of ice cream in the receptacle forces said nozzle upwardly, this movement being aided by the action of the counterweights 34 until the ice cream reaches the upper level of the receptacle 10. The receptacle may then be moved laterally from beneath the nozzle and an empty one slid into place without interrupting the continuous flow of the stream of ice cream from the freezer.

As there is a considerable mass of ice cream in the enlarged end of the nozzle it may have a tendency to drop from the outlet end of the nozzle while an empty can is being brought into position due to the tension of the unsupported flowing stream of ice cream beyond said outlet end. To resist this tendency there may be provided a grating 36 as shown in Figs. 1 and 2 extending across the bottom end of the discharge nozzle and detachably or permanently secured by soldering or any other suitable means. This grating 36 tends to support the body of ice cream in the enlarged end portion of the nozzle, so that it does not fall out during the removal of a filled receptacle and the replacing of an empty one in position.

In the form shown in Figs. 3 and 4 the nozzle 20 at its discharge end is somewhat smaller than the receptacle and has a radially outwardly extending annular flange 37 extending from the outlet rim of the nozzle substantially to the inner periphery of the receptacle. This flange 37 may form part of the grate 36, or an imperforate wall and may assist in shearing off the ice cream across the top of a filled receptacle, and also as a wiping lip. This flange 37 also serves to spread the ice cream towards the inner periphery of the receptacle, as it is discharged from the nozzle 20. Since the outlet end of the nozzle 20 is substantially co-extensive with the cross-section of the receptacle, and since the flange is comparatively narrow, the spreading action of this flange is not sufficient to affect the uniform distribution of the solid particles in the ice cream.

In the construction shown in Fig. 5, the discharge nozzle comprises a pair of sections 42 and 43 flaring towards the outlet end of the nozzle and interconnected by a cylindrical section 44. The lower end of the flared section 43 is shown as provided with a cylindrical skirt 45 having a cross-section conforming substantially with the cross-section of the receptacle. By means of this construction the ice cream, instead of being continuously and progressively expanded to the discharge point, as in the construction shown in Figs. 1-4, is expanded in separate shorter steps along the sections 42 and 43 so that between said expanding sections the moisture films have a chance to become adjusted to the expanded condition of the ice cream.

By means of my invention the rupturing of the moisture films as the result of the expansion of the air in the ice cream mix, is naturally reduced if not entirely eliminated. The ice cream is expanded either continuously or in steps to the approximate cross-section of the receptacle being filled, so that film rupturing friction is minimized, and a uniform distribution of the solid particles is maintained in the ice cream.

Having thus described my invention, what I claim as new and desire to secure by Letters Patent is:—

1. In combination, a pressure freezer for continuously forming under pressure and delivering an aerated semi-frozen plastic ice cream, a receptacle for receiving said ice cream and of substantially uniform cross section throughout its height, a delivery conduit connected to said freezer, and a discharge nozzle connected to said conduit and adapted to extend substantially to the bottom of said receptacle, said nozzle having a passage therethrough with its inlet end of approximately the cross sectional area of the conduit, and its outlet end in said receptacle of but slightly less cross sectional area than said receptacle, the cross sectional area of said passage gradually increasing from said inlet end to said outlet end, whereby the ice cream stream progressively spreads laterally at decreasing velocity and under decreasing pressure during flow through said nozzle, and has substantially no lateral flow in the receptacle after leaving said outlet and during relative vertical movement of the nozzle and receptacle at a rate corresponding to the rate of filling of the receptacle.

2. In combination, a pressure freezer for continuously forming under pressure and delivering an aerated semi-frozen plastic ice cream, a receptacle for receiving said ice cream and of substantially uniform cross section throughout its height, a delivery conduit connected to said freezer, and a discharge nozzle connected to said conduit and adapted to extend substantially to the bottom of said receptacle, said nozzle being substantially in the form of a cone with outlet in said receptacle and of but slightly less cross sectional area than said receptacle, whereby the ice cream stream spreads laterally in the nozzle to approximately the cross section of the receptacle as the velocity of flow and the pressure decreases, and during relative vertical movement of the nozzle and receptacle at a rate corresponding to the rate of filling of the receptacle.

3. An apparatus for delivering an aerated semi-frozen plastic ice cream under pressure into a receptacle of substantially uniform cross section throughout its height, said apparatus including a discharge nozzle adapted to extend substantially to the bottom of said receptacle, and having a passage therethrough with its outlet end of but slightly less cross sectional area than said receptacle, the cross sectional area of said passage gradually increasing from its inlet end to said outlet end, whereby the ice cream stream progressively spreads laterally at decreasing velocity and under decreasing pressure during flow through said nozzle, and has substantially no lateral flow in the receptacle after leaving said outlet and during relative vertical movement of the nozzle and receptacle at a rate corresponding to the rate of filling of the receptacle.

4. A device for filling a receptacle with plastic material, including a discharge nozzle having the terminal section thereof flaring outwardly for gradually reducing the pressure of the plastic material flowing through said nozzle, said nozzle being adapted to project into the open top of the receptacle, and having a grating across the outlet end permitting free passage therethrough of the plastic material during the filling of the receptacle, but substantially preventing the body of plastic material in the nozzle from dropping out by gravity during the substituting of an empty receptacle for a filled one.

5. In combination, a pressure freezer for continuously forming under pressure and delivering a stream of aerated semi-frozen plastic ice cream, a conduit connected to said freezer, an apparatus for introducing solid bodies into said stream flowing through said conduit, and a depending discharge nozzle on said conduit and having a passage therethrough of gradually increasing cross sectional area from the inlet end to the outlet end, the outlet end being but slightly less in cross sectional area than the receptacle to be filled, whereby the ice cream stream with the incorporated solids progressively spreads laterally during flow through the nozzle and has substantially no lateral flow after leaving the outlet and during relative vertical movement of the nozzle and receptacle during the filling of the latter.

6. In combination, a conduit for delivering an aerated semi-frozen plastic ice cream, an apparatus for introducing solid bodies into said conduit, a receptacle for receiving said ice cream and of substantially uniform cross section throughout its height, a discharge nozzle on said conduit and having a flaring passage with an outlet slightly less in cross sectional area than said receptacle, and a grating across said outlet, permitting free passage of said solids therethrough but preventing the body of ice cream in said flaring nozzle from falling out during exchange of an empty for a filled receptacle.

7. A device for filling a receptacle with plastic material, including a discharge nozzle having the terminal section thereof flaring outwardly for gradually reducing the pressure of the plastic material flowing through said nozzle, said nozzle being adapted to project into the open top of the receptacle, and a flange in the plane of the outlet end of said nozzle and extending outwardly beyond the rim of said nozzle substantially to the inner periphery of said receptacle.

8. A device for filling a receptacle with plastic material, including a discharge nozzle having the terminal section thereof flaring outwardly for gradually reducing the pressure of the plastic material flowing through said nozzle, said nozzle being adapted to project into the open top of the receptacle, a grating across the lower end of the nozzle, and a flange in the plane of the outlet end of said nozzle and extending outwardly beyond the rim of said nozzle substantially to the inner periphery of said receptacle.

9. In combination, a pressure freezer for continuously forming under pressure and delivering a stream of aerated semi-frozen plastic ice cream, a conduit connected to said freezer, an apparatus for introducing solid bodies into said stream flowing through said conduit, and a depending discharge nozzle on said conduit and having the terminal section thereof flaring outwardly for gradually reducing the pressure of the ice cream flowing through said nozzle, said nozzle being adapted to project into the open top of the receptacle, and a flange in the plane of the outlet end of said nozzle and extending outwardly beyond the rim of said nozzle substantially to the inner periphery of said receptacle.

CHARLES F. WEINREICH.